(12) United States Patent
Doris et al.

(10) Patent No.: US 6,564,614 B1
(45) Date of Patent: May 20, 2003

(54) METHOD AND APPARATUS FOR VACUUM TESTING WATER RESISTANT AND WATERTIGHT RISERS AND LIDS

(75) Inventors: Albert F. Doris, Edina, MN (US); Robin L. Berg, Sr., Hudson, WI (US); Douglas Morrissette, Minneapolis, MN (US); James S. Anderson, Trabuco Canyon, CA (US)

(73) Assignee: Xerxes Corporation, Minneapolis, MN (US)

( * ) Notice: Subject to any disclaimer, the term of this patent is extended or adjusted under 35 U.S.C. 154(b) by 2 days.

(21) Appl. No.: 09/840,995

(22) Filed: Apr. 25, 2001

(51) Int. Cl.$^7$ ................................................ G01M 3/04
(52) U.S. Cl. ......................................................... 73/49.2
(58) Field of Search ..................................... 73/49.2, 40

(56) References Cited

U.S. PATENT DOCUMENTS

| | | | |
|---|---|---|---|
| 4,462,249 A | * 7/1984 | Adams | 73/40.5 A |
| 4,739,659 A | 4/1988 | Sharp | |
| 4,875,361 A | 10/1989 | Sharp | |
| 4,925,046 A | 5/1990 | Sharp | |
| 4,948,007 A | 8/1990 | Berg et al. | |
| 4,958,957 A | 9/1990 | Berg et al. | |
| 4,974,739 A | 12/1990 | Gelin | |
| 4,989,447 A | 2/1991 | Gelin | |
| 5,017,044 A | 5/1991 | Sharp | |
| 5,020,358 A | 6/1991 | Sharp | |
| 5,046,354 A | * 9/1991 | Mungia et al. | 73/49.2 |
| 5,117,677 A | * 6/1992 | Hendershot et al. | 73/49.2 |
| 5,184,504 A | * 2/1993 | Spring | 73/49.2 |
| 5,216,914 A | * 6/1993 | Horner | 73/49.2 |
| 5,220,823 A | 6/1993 | Berg et al. | |
| 5,397,020 A | * 3/1995 | Witt | 220/404 |
| 5,544,974 A | 8/1996 | Berg et al. | |
| 5,595,456 A | 1/1997 | Berg et al. | |
| 5,668,308 A | * 9/1997 | Denby | 73/49.2 |
| 5,720,404 A | 2/1998 | Berg et al. | |
| 5,803,304 A | 9/1998 | Berg | |
| 6,167,608 B1 | 4/2001 | Burwell et al. | |

OTHER PUBLICATIONS

U.S. patent application Ser. No. 5,220,823, filed Jun. 22, 1993, patented.
U.S. patent application Ser. No. 4,958,957, filed Sep. 25, 1990, patented.
U.S. patent application Ser. No. 4,948,007, filed Aug. 14, 1990, patented.
U.S. patent application Ser. No. 5,803,304, filed Sep. 8, 1998, patented.
U.S. patent application Ser. No. 5,544,974, filed Aug. 13, 1996, patented.
U.S. patent application Ser. No. 09/657,225, filed Sep. 7, 2000, pending.

(List continued on next page.)

Primary Examiner—Daniel S. Larkin
Assistant Examiner—C D Garber
(74) Attorney, Agent, or Firm—Piper Rudnick LLP; Steven B. Kelber

(57) ABSTRACT

In a method and apparatus for detecting leaks in riser and lid assemblies, a difference in pressure between the inside of the riser and cover assembly and the outside is created and monitored to insure that no leaks exist. Preferably, a vacuum is created on the inside of the riser and cover assembly. This vacuum is then monitored for a set period of time to insure that the total change in pressure does not exceed a threshold. In a highly preferred embodiment, an apparatus automatically creates the desired vacuum and then isolates a vacuum gauge to monitor the vacuum in the riser. Method for isolating a leak are also presented in the event that a leak is detected.

4 Claims, 7 Drawing Sheets

OTHER PUBLICATIONS

U.S. patent application Ser. No. 5,720,404, filed Feb. 24, 1998, patented.
U.S. patent application Ser. No. 5,595,456, filed Jan. 21, 1997, patented.
U.S. patent application Ser. No. 09/014,629, filed Jan.28, 1998, pending.
U.S. patent application Ser. No. 09/864,153, filed May 25, 2001, pending.
U.S. patent application Ser. No. 6,167,608, filed Jan. 2, 2001, patented.
U.S. patent application Ser. No. 09/617,239, filed Jul. 14, 2000, pending.
U.S. patent application Ser. No. 4,974,739, filed Dec. 4, 1990, patented.
U.S. patent application Ser. No. 4,989,447, filed Feb. 5, 1991, patented.
U.S. patent application Ser. No. 4,739,659, filed Apr. 26, 1998, patented.
U.S. patent application Ser. No. 5,017,044, filed May 21, 1991, patented.
U.S. patent application Ser. No. 4,875,361, filed Oct. 24, 1998, patented.
U.S. patent application Ser. No. 4,925,046, filed May 15, 1990, patented.
U.S. patent application Ser. No. 5,020,358, filed Jun. 4, 1991, patented.
U.S. patent application Ser. No. 09/840,995, filed Apr. 25, 2001, pending.

* cited by examiner

METHOD AND APPARATUS FOR VACUUM TESTING WATER RESISTANT AND WATERTIGHT RISERS AND LIDS

BACKGROUND OF THE INVENTION

1. Field of the Invention

The invention relates to storage tanks generally and more particularly to vacuum testing risers for storage tanks.

2. Related Art

Storage tanks are used to store a wide variety of materials. Storage tanks are often located underground to conserve space. Special concern arises when such underground storage tanks are used to store environmentally hazardous materials. For example, underground storage tanks are often used to store gasoline and other petroleum products. Underground storage tanks are also used to store hazardous chemicals or other manufacturing liquid waste and sewage (such tanks are often referred to as wastewater storage tanks). Because of the nature of these materials, concern about leaks in underground storage tanks has lead many municipalities to pass laws requiring leak detection and secondary containment systems. Even in situations where there are no laws governing underground storage tanks containing environmentally hazardous materials, concern for the environment has led many to take some or all of the aforementioned precautions in connection with their tanks.

The aforementioned concerns have led to the introduction of water resistant and watertight riser and cover systems in the last few years for access to and protection of the manway and/or pipe/tank connections. An example of a watertight riser and cover system is disclosed in U.S. Pat. No. 5,595,456, which is commonly owned by the assignee of the present invention. The motivation for providing a watertight riser and lid system is that many times the connection between the tank and a supply line passes through the riser, and it is possible for a leak to develop in such a connection.

To date, there are no known regulations concerning the watertightness of a riser and lid system. Testing the watertightness of a riser and lid system is complicated by the fact that the riser and lid system must be installed on-site rather than at the factory.

Fibrelite has developed a complicated and expensive system that must be installed along with the original installation of their system. A serious drawback to the Fibrelite system is that it appears to require that the actual riser lid be replaced with a special test cover. Thus, the Fibrelite system does not test the actual riser lid seals.

What is needed is a simple and economical method and apparatus for periodically testing the watertightness of watertight riser and lid assemblies, particularly those that are already installed throughout the country.

SUMMARY OF THE INVENTION

The present invention meets the foregoing need to a great extent by providing a simple method and apparatus for detecting leaks in watertight riser and lid system. This can be used for water resistant systems by adding the water tight lid. A difference in pressure (preferably a vacuum created on the inside of the riser) between the inside of the riser and lid assembly and the outside is created and monitored to insure that no leaks exist. The inside of the riser assembly is then monitored for a set period of time to insure that the total change in pressure does not exceed a threshold. In a highly preferred embodiment, an apparatus automatically creates the desired vacuum and then isolates a vacuum gauge to monitor the vacuum in the riser. Methods for isolating a leak are also presented in the event that a leak is detected.

BRIEF DESCRIPTION OF THE DRAWINGS

The aforementioned advantages and features of the present invention will be more readily understood with reference to the following detailed description and the accompanying drawings in which.

DETAILED DESCRIPTION

In the following detailed description, numerous details, such as vacuum gauge readings and time periods, are set forth in order to provide a more thorough understanding of the present invention. These details should not be understood to limit the present invention.

The present invention is believed to be particularly applicable to underground storage tanks. Accordingly, the preferred embodiments discussed below are underground storage tanks. However, the present invention should not be understood to be limited to underground storage tanks.

Figure 5:
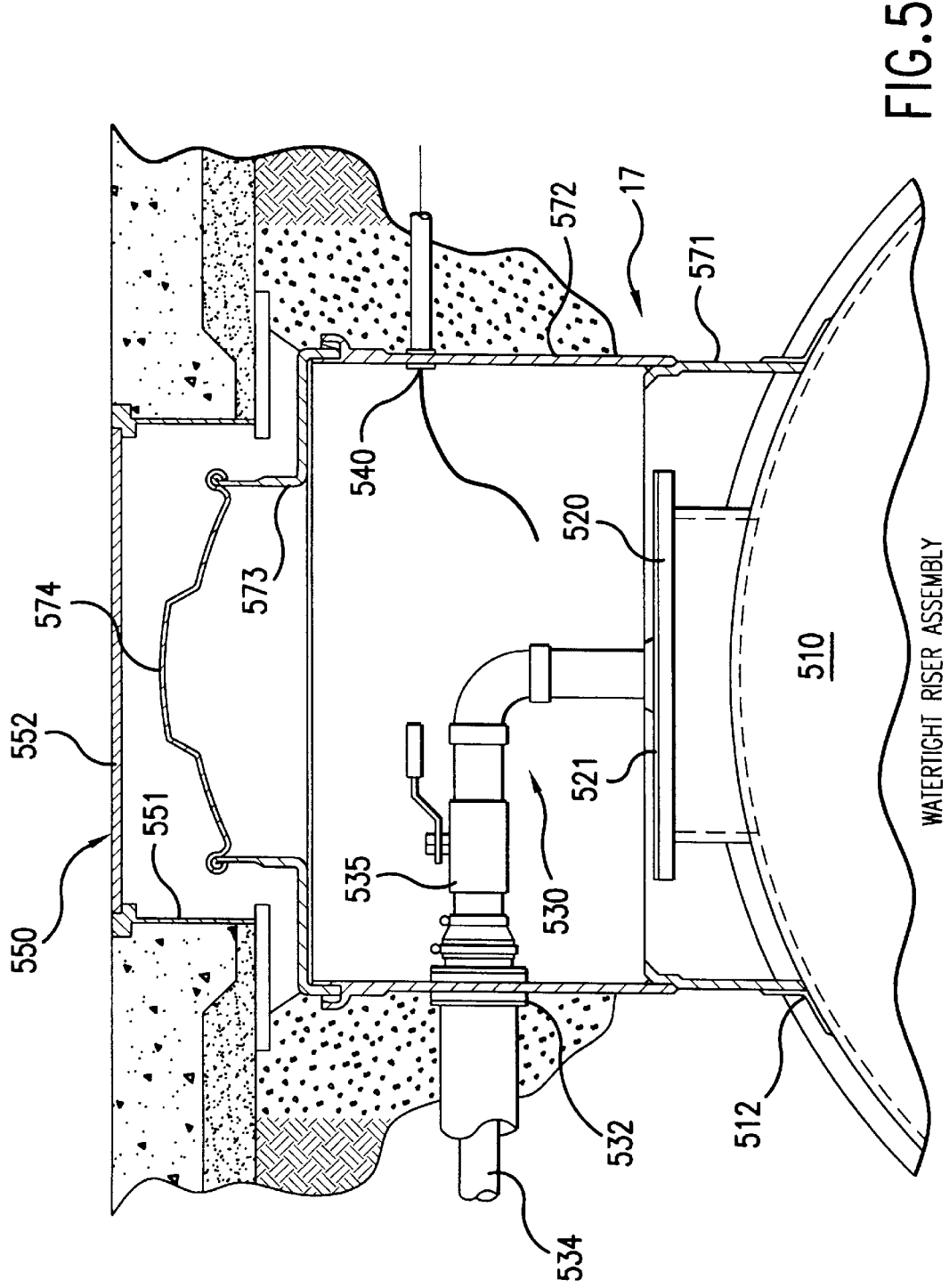
FIG. 5 is a cross sectional diagram showing installation of a watertight riser and lid assembly.

Referring now to the drawings, in which like reference numerals represent like parts throughout the several views, FIG. 5 illustrates the installation of an underground storage tank 510. The tank 510 includes a manway 520. The manway 520 forms a structural part of the tank 510. In the case where the tank 510 is a double walled underground storage tank, the manway 520 will often be formed such that a monitoring system that monitors the integrity of the annulus between the two walls of the double walled storage tank 510 will also monitor the integrity of the double walled manway 520.

Connected to a lid 521 of the manway 520 is a supply line 530, which includes a shut off valve 535. The supply line 530 passes through a bulkhead fitting 532 in a wall 572 of riser assembly 17. Riser assembly 17 is attached to a riser collar 571 that is adhered to the tank by a joint 512. The riser collar 571 is typically installed at the factory. However, the riser wall 572 must typically be installed in the field as the height of the riser wall 572 will not be known until the tank has been installed. The supply line 535 is connected to an underground supply line 534.

Also passing through the riser wall 572, is an electrical connection 540. The electrical connection 540 maybe used for a number of purposes including the monitoring the integrity of the interior of the riser 572 or, in other embodiments, for electrically controlling the valve 535.

The connection between the riser wall 572 and the riser collar 571 is typically made using an adhesive bond. Sometimes, fiberglass (also know as fiber reinforced plastic) is also used. This is especially true where the tank 510 is a fiberglass underground storage tank and/or the riser assembly 17 comprises fiberglass. It is critical to test this connection between the riser wall 572 and the riser collar 571 because the connection is often made in the field. A riser lid 573 is attached at the top of the riser wall 572. A riser cover 574 is provided on the riser lid 573. The riser cover may be opened and closed by personnel needing access to the interior of the riser for preforming such operations as manipulating the valve 535. The riser cover 574 forms an airtight seal with the riser lid 573. An exemplary riser cover 574 is disclosed in the previously mentioned U.S. Pat. No. 5,595,456.

In order to protect the riser and allow access to it, a street box 550 is installed over the riser as is well known in the art. The street box 550 includes a side wall 551 and a lid 552 which is typically formed of steel. The street box 550 does not form part of the riser assembly 17.

Figure 1:
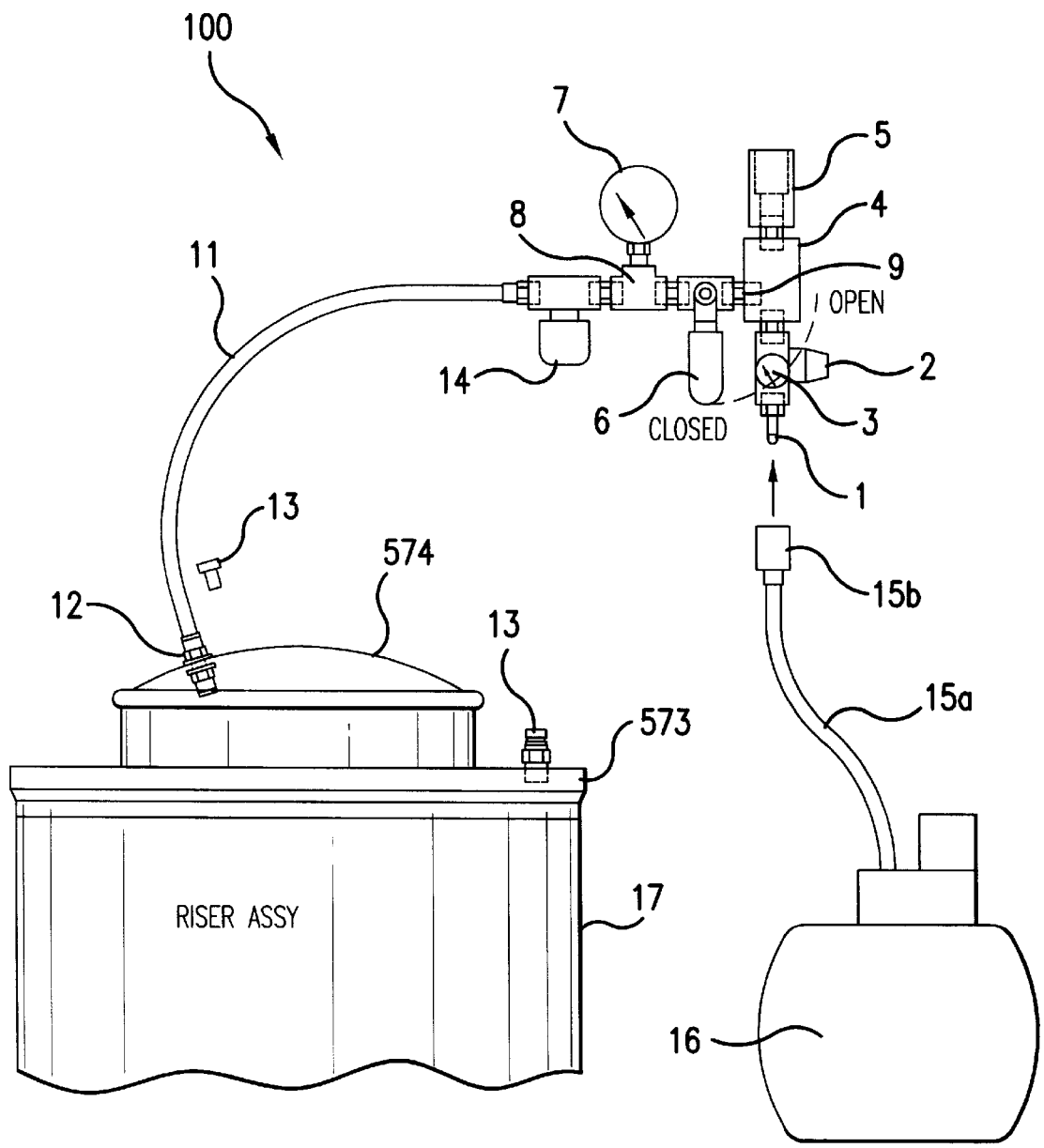
FIG. 1 is a side view of a manual leak detecting apparatus according to one embodiment of the present invention.

As previously discussed herein, it is desirable to monitor the integrity of the riser assembly 17. Referring now to FIG. 1, an apparatus 100 for testing the integrity of the riser assembly 17 is illustrated. The riser cover 574 includes a bulkhead fitting 12 which establishes fluid communication between the inside and the outside of the riser assembly 17. The use of the bulkhead fitting 12 through the riser cover 574 allows the actual seals between the riser cover 574 and the lid 573 to be tested. Tubing 11 connects the bulkhead fitting 12 to a vacuum filter 14. The filter 14 is connected to a "T" 8. One branch of the "T" is attached to a gauge 7. The other branch of the "T" 8 is attached to a valve 6. When the valve 6 is in the closed position, the gauge 7 and the interior of the riser assembly 17 will be isolated so that the gauge 7 is indicative of the vacuum in the riser assembly 17.

The other end of the valve 6 is connected to a vacuum port 9 of a vacuum pump 4. A vacuum is created at vacuum port 9 by the passage of compressed air through the vacuum pump 4. The compressed air is supplied by a compressed air source 16. A supply line 15a from the compressed air source 16 terminates in a quick coupling connector 15b. The quick coupling connector 15b is connected to a quick coupling nipple 1 at the input of an air pressure regulator 2. The air pressure regulator 2 includes a gauge 3 for monitoring the input pressure from the compressed air source 16. Preferably, the air regulator 2 maintains the pressure input to the vacuum pump 4 at approximately 10 psig. Of course, those of skill in the art will recognize that the input pressure to the vacuum pump 4 will vary depending upon the volume inside the riser assembly 17 and the desired vacuum. It should also be recognized that the input pressure to the vacuum pump 4 can be increased during the early stages of operation to more rapidly evacuate the interior of the riser assembly 17. Attached to the outlet of the vacuum pump 4 is vent outlet 5.

In highly preferred embodiments of the present invention, a venturi-type vacuum pump as described above, rather than a mechanical vacuum pump that includes moving parts, is used. This is especially important when flammable materials such as gasoline are stored in the tank. The lack of moving parts in the venturi-type vacuum pump reduces the risk of an accidental ignition of leaking gasoline, thereby significantly improving safety as compared to a mechanical vacuum pump.

Figure 2:
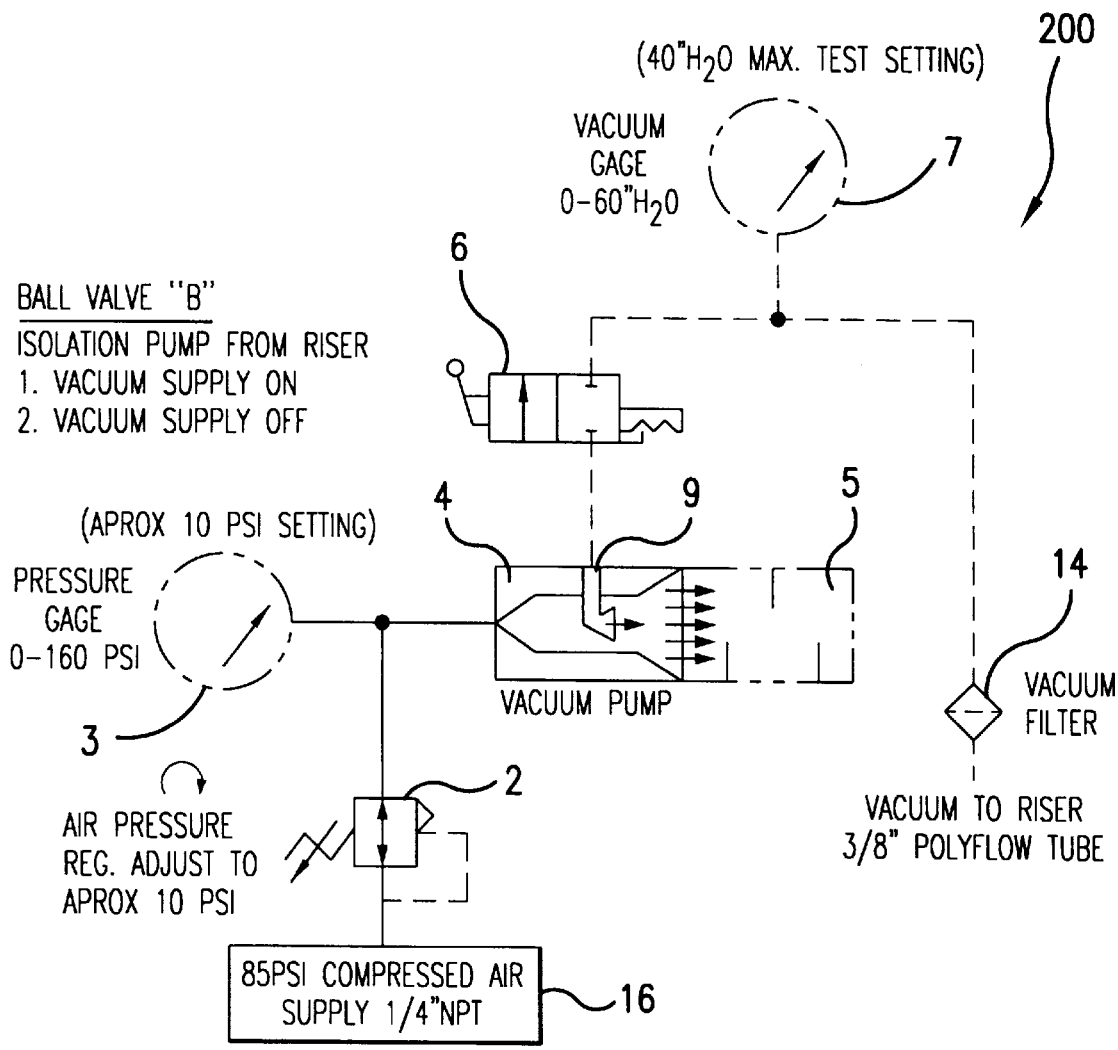
FIG. 2 is a schematic diagram of the apparatus of FIG. 1.

Operation of the apparatus of 100 of FIG. 1 will now be explained with reference to the schematic 200 of FIG. 2. The compressed air supply 16 is regulated by the regulator 2 to maintain the input pressure at the vacuum pump 4 at approximately 10 psig. The gauge 3 may be used to monitor the input pressure to the vacuum pump 4. Compressed air passing through vacuum pump 4 and exiting via vent outlet 5 creates a vacuum at vacuum port 9 of pump 4. Valve 6 is initially left in the open position so that the vacuum pump 4 can create a vacuum at the interior of the riser assembly 17. When the gauge 7 indicates that a vacuum of approximately 40 inches of water (3 inches of mercury or 1.5 psig) has been achieved, the valve 6 is then moved to the closed position, which isolates the vacuum created in the riser assembly 17 from the pump 4. The gauge 7 is observed for approximately 15 minutes. If the gauge 7 does not indicate a drop of more than 2 inches of water after giving the vacuum a sufficient amount of time to stabilize, there is no leak and the riser assembly is watertight. If the pump 4 is unable to achieve a 40 inches of water vacuum, or the vacuum gauge indicates a vacuum drop of more than 2 inches of water during the aforementioned 15 minute period, the riser 17 is not watertight. Leak detection procedures, as will be described in further detailed below, are the employed to detect the location of the leak.

Figure 3:
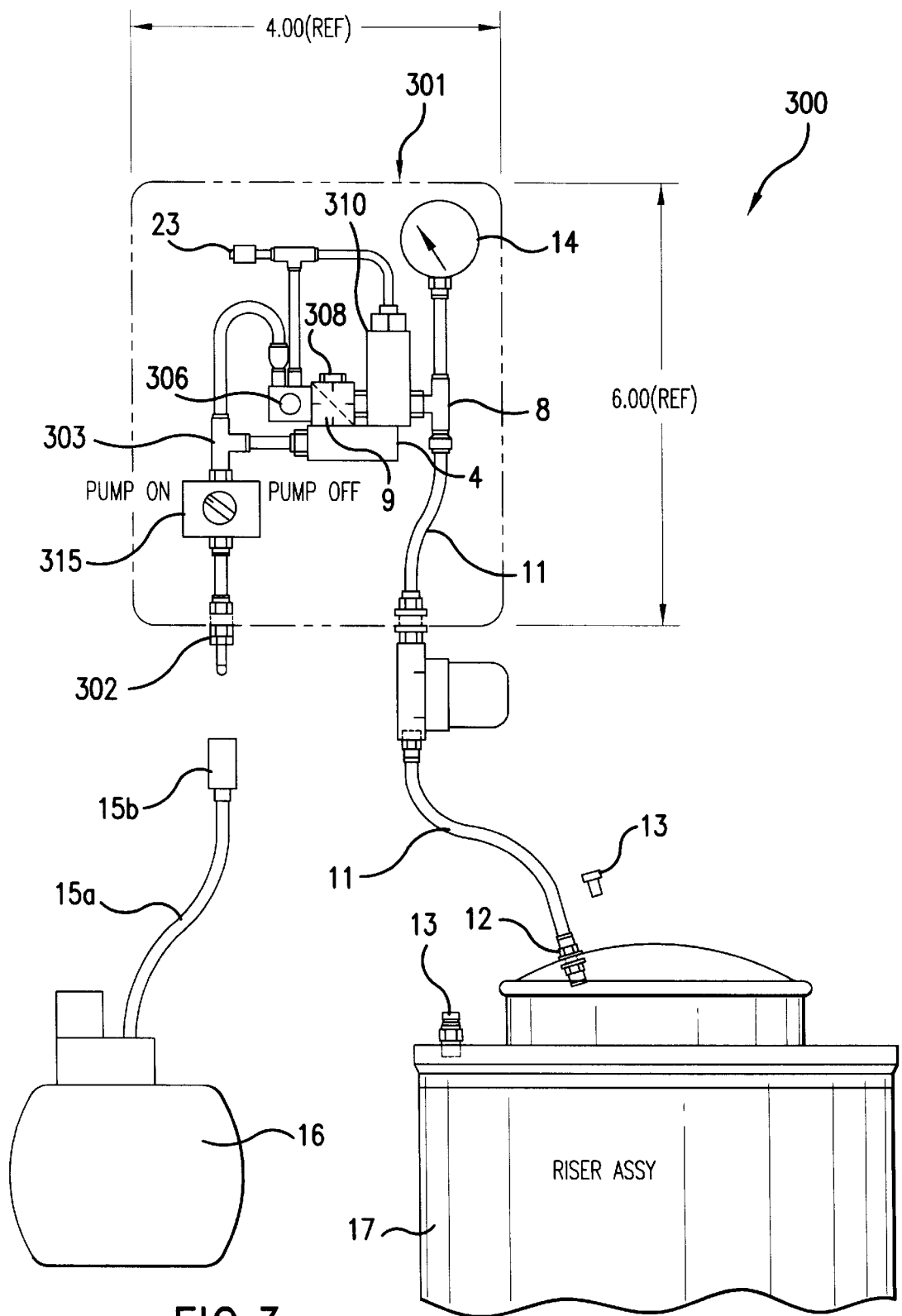
FIG. 3 is an automatic leak detection apparatus according to a second embodiment of the present invention.
Figure 4:
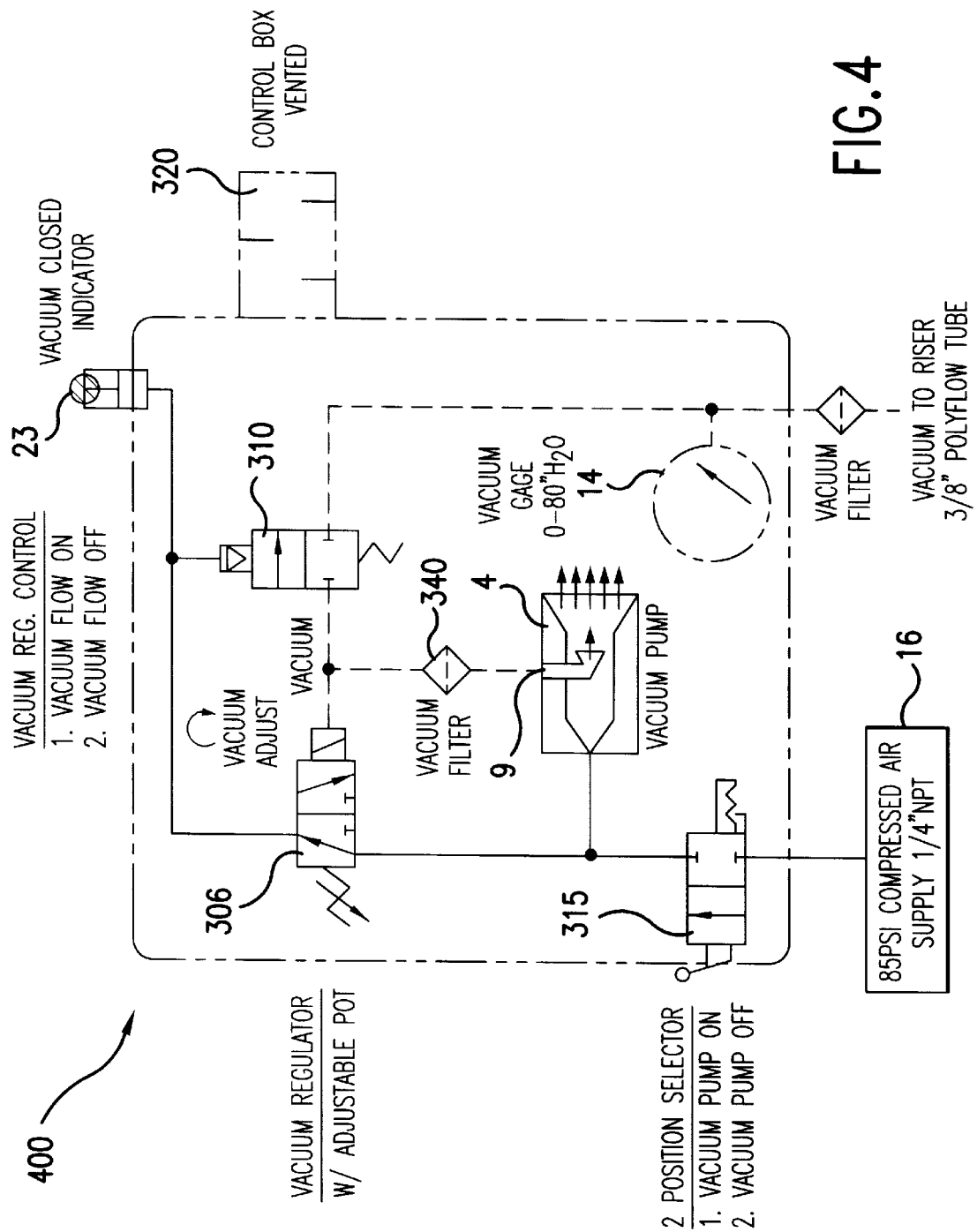
FIG. 4 is a schematic diagram of the leak detection apparatus of FIG. 3.

A second, automated version of the present invention is illustrated by the diagram 300 in FIG. 3 and the schematic diagram 400 of FIG. 4. In this embodiment, a compressed air source 16 is connected to a nipple 302 on a control box 301 through a supply tube 15a and a coupling 15b. The nipple 302 is connected to a on/off valve 315. When the valve 315 is in the off position, the control box 301 is isolated from the compressed air source 16.

When the control valve 315 is in the on position, compressed air from the source 16 supplies a vacuum pump 4. Also connected to the valve 315, by a T 303, is an adjustable vacuum switch (regulator) 306. The switch 306 is controlled by the vacuum from the vacuum port 9 on the vacuum pump 4. When the switch 306 is in the closed position, because the vacuum sensed at the vacuum port 9 is below the desired 40 inch threshold, compressed air from the supply 16 is fed through the switch 306 to a pressure actuated valve 310. When sufficient pressure from the supply 16 is input to the valve 310, the valve 310 is positioned such that the vacuum port 9 of the pump 4, which is connected on the input side of the valve 310, is connected to the gauge 14 and the riser 17. When the switch 306 senses that the vacuum at the vacuum port 9 reaches the predetermined 40 inch threshold, the switch 306 cuts off the pressurized air supplied to the valve 310 and causes the valve 310 isolate the riser assembly 17 from the vacuum pump 4. A vacuum closed indicator 23 is also connected to the output switch 306. The vacuum close indicator 23 allows the status of the switch 306 to be determined. In use, once the operator recognizes that the vacuum close indicator 23 indicates that the switch 306 has opened, thereby causing valve 310 to isolate the pump 4 from the riser 17, the operator monitor the gauge 14 for the same 15 minute period discussed above and verifies that no more than 2 inches of vacuum loss occurs.

Figure 6A:
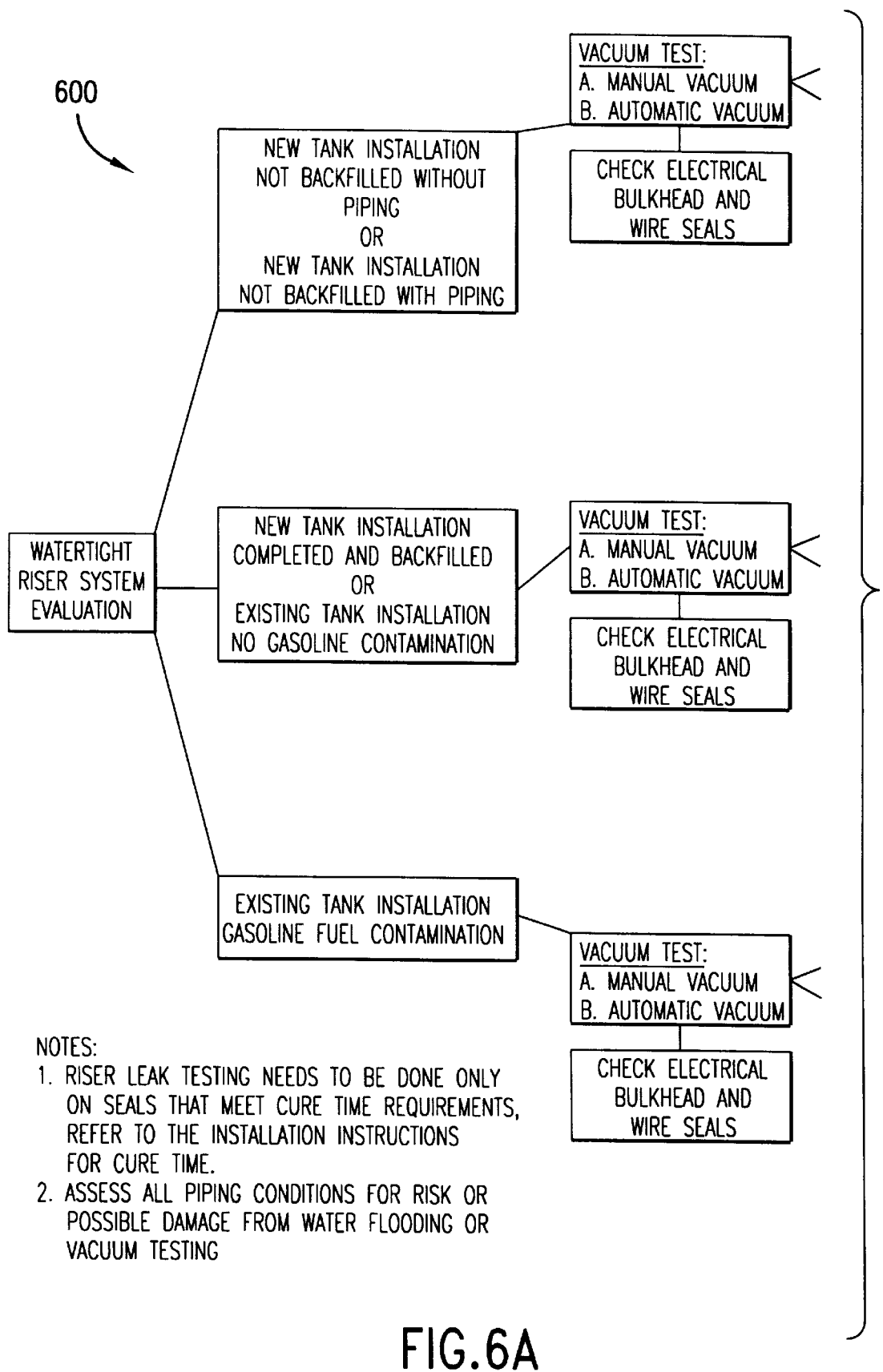
FIG. 6 is a flowchart of a leak isolation method according to an embodiment of the present invention.
Figure 6B:
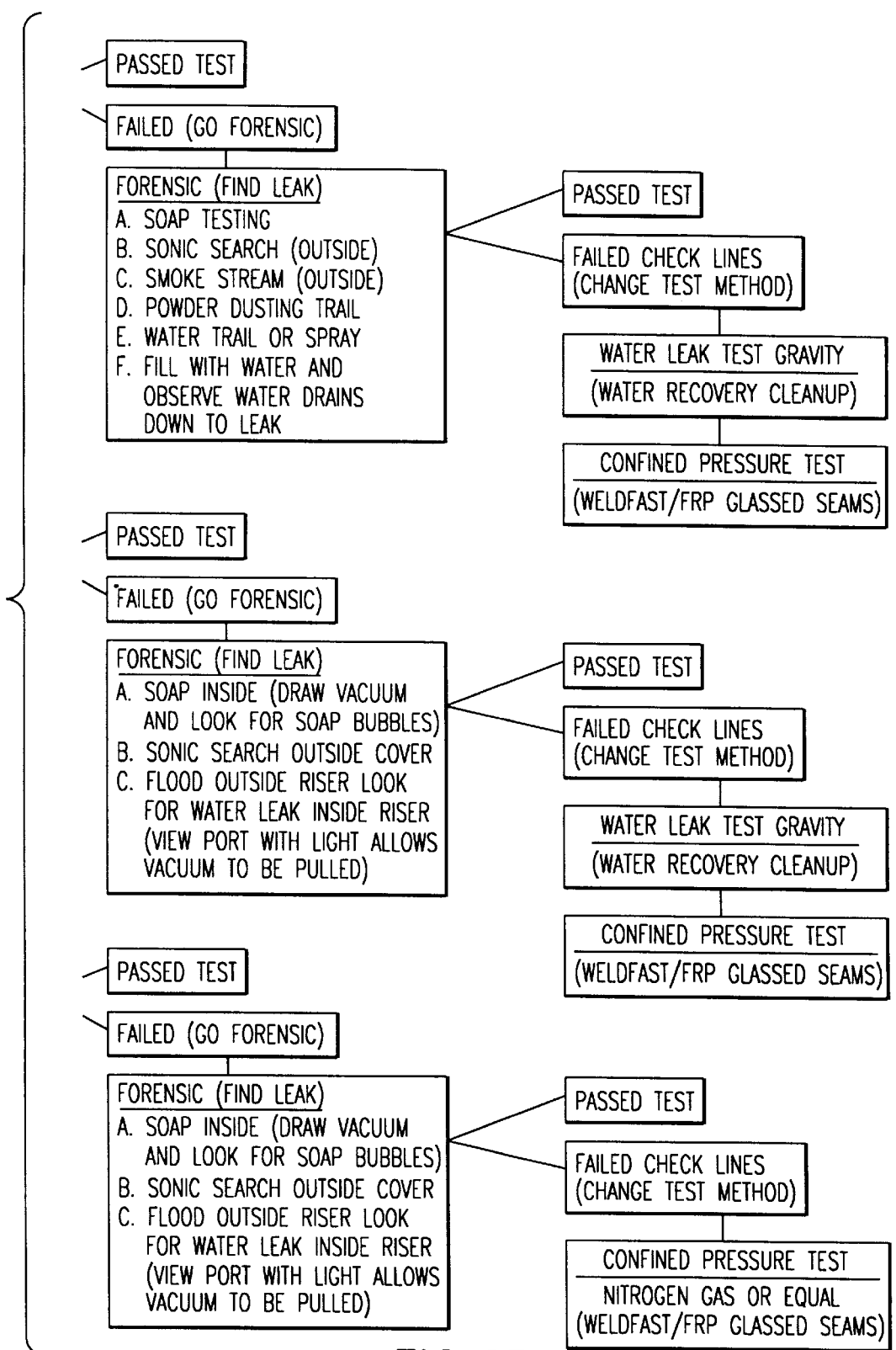

Upon the detection of a leak, the flowchart 600 is followed to isolate the location of the leak. When a leak has been detected by either the automatic vacuum test or the manual vacuum test, a soap test is performed. The soap test is performed both outside the riser assembly 17 and inside the riser assembly 17 in the case of a new installation, and only on the inside of the riser assembly 17 in the case of an existing tank or where the backfilling has already occurred. Sonic search methods, smoke stream methods, may also be used as indicated in FIG. 6. In a new installation, the inside of the riser 17 may be filled with water and the water level allowed to drop until the level of the leak is reached. In a different test, the outside of the riser assembly 17 (e.g., the surrounding soil) may be flooded and the dry interior of the riser assembly 17 be visually monitored for any water seepage.

Obviously, numerous other modifications and variations of the present invention are possible in light of the above teachings. It is therefore to be understood that within the scope of the pending claims, the invention may be practiced otherwise and as specifically described herein.

What is claimed is:

1. An apparatus for testing a riser assembly for leaks comprising:

a vacuum pump having a vacuum port;

a valve, the valve having a first end and a second end, the first end of the valve being connected to the vacuum port and the second end being in fluid communication with an inside of the riser assembly;

a gauge having an inlet, the inlet being in fluid communication with to an inside of the riser assembly and the second end of the valve; and a vacuum controlled switch having an input side, an output side, and a vacuum monitoring port, the vacuum monitoring port being in fluid communication with the vacuum port of the vacuum pump, the input of the vacuum controlled switch being connectable to a compressed air supply, the output of the vacuum controlled switch being connected to a valve input port of the valve, the vacuum controlled switch being configured to allow compressed air to flow from the input side through the output side to the valve input port such that valve input port controls the valve to allow fluid communication between the inside of the riser assembly and the vacuum pump when the vacuum monitoring port detects that a vacuum inside the riser assembly is below a predetermined threshold, the vacuum controlled switch further being operable to shut off fluid communication between the input side and the output side when the vacuum monitoring port detects that the vacuum inside the riser assembly is above the predetermined threshold, thereby causing the valve to isolate the inside of the riser assembly from the vacuum pump;

wherein the valve is spring loaded and is controllable by air pressure input at the valve input port to move between a first position in which the vacuum pump is connected to the inside of the riser assembly through the valve so that a vacuum inside of the riser assembly may be created, and a second position in which the inside of the riser assembly is isolated from the vacuum pump and monitorable with the gauge.

2. The apparatus of claim 1, further comprising an indicator in fluid communication with the output side of the vacuum controlled switch, the indicator indicating whether or not the vacuum controlled switch is configured to allow communication between the input side and the output side.

3. The apparatus of claim 2, wherein the vacuum pump utilizes compressed air to create a vacuum.

4. The apparatus of claim 1, wherein the vacuum pump is a venturi-type vacuum pump.

* * * * *